United States Patent
Rouge et al.

(10) Patent No.: US 6,215,522 B1
(45) Date of Patent: Apr. 10, 2001

(54) METHOD OF ACQUIRING AN IMAGE BY PUSH-BROOM SCANNING

(75) Inventors: Bernard Rouge; Christophe Latry, both of Toulouse (FR); Jean-Claude Favard, Varese (IT); Gilbert Pauc, Lacroix-Falgarde (FR)

(73) Assignee: Centre National d'Etudes Spatiales, Paris (FR)

( * ) Notice: Subject to any disclaimer, the term of this patent is extended or adjusted under 35 U.S.C. 154(b) by 0 days.

(21) Appl. No.: 08/849,902

(22) PCT Filed: Jul. 26, 1996

(86) PCT No.: PCT/FR96/01188

§ 371 Date: Jun. 18, 1997

§ 102(e) Date: Jun. 18, 1997

(87) PCT Pub. No.: WO97/05451

PCT Pub. Date: Feb. 13, 1997

(30) Foreign Application Priority Data

| Jul. 28, 1995 | (FR) | 95 09241 |
| Jul. 28, 1995 | (FR) | 95 09242 |
| Jul. 28, 1995 | (FR) | 95 09263 |

(51) Int. Cl.⁷ .................. H04N 3/14; H04N 7/18
(52) U.S. Cl. ............... 348/315; 348/145; 348/202; 358/483; 358/494; 382/280
(58) Field of Search ................... 382/276, 280, 382/293, 294, 299, 300; 358/443, 445, 447, 448, 474, 482, 483, 494, 497; 348/96, 108, 109, 195, 196, 199, 201–206, 294, 311–315, 144, 145; H04N 7/18, 3/14

(56) References Cited

U.S. PATENT DOCUMENTS

| 4,683,496 | 7/1987 | Tom . |
| 5,067,016 | 11/1991 | Wang . |
| 5,181,102 | * 1/1993 | Artigalas ............... 348/206 |
| 5,185,771 | 2/1993 | Anger et al. . |
| 5,251,037 | 10/1993 | Busenberg . |
| 5,668,593 | * 9/1997 | Lareau ............... 348/146 |
| 5,692,062 | * 11/1997 | Lareau ............... 382/107 |

FOREIGN PATENT DOCUMENTS

| 0 368 354 A3 | 5/1990 | (EP) ............... H04N/9/04 |
| 0 532 221 A2 | 3/1993 | (EP) ............... G06F/15/62 |
| 0 612 185 A1 | 8/1994 | (EP) ............... H04N/5/225 |
| WO 91/03125 | 3/1991 | (WO) ............... H04N/5/335 |

OTHER PUBLICATIONS

Chavez, P.S., Jr., et al., "Comparison of Three Different Methods to Merge Multiresolution and Multispectral Data: Landsat TM and SPOT Panchromatic," Photogrammetric Engineering & Remote Sensing, vol. 57, No. 3, Mar. 1991, pp. 295–303.

Hagolle, Olivier, et al., "How to Double the Spatial Resolution of a Push–Broom Instrument," IEEE Intl. Geosci. and Remote Sensing Symposium, vol. III, Calif. Inst. of Technol., Pasadena, Calif. Aug. 8–12, 1994, pp. 1553–1555.

* cited by examiner

Primary Examiner—Wendy R. Garber
Assistant Examiner—Ngoc-Yen Vu
(74) Attorney, Agent, or Firm—Pollock, Vande Sande & Amernick, R.L.L.P.

(57) ABSTRACT

A method of acquiring and processing a satellite observation image of the earth by means of at least one strip or a matrix of detectors of the charge transfer type travelling over an observed zone, in which a plurality of pixels are acquired, which pixels are sampled in a staggered configuration, the method being characterized in that the line pitch and the column pitch of said staggered sampling are such that the image spectrum is situated mainly in a zone of the Fourier plane where the modulation transfer function is meaningful and where spectrum aliasing is limited.

6 Claims, 6 Drawing Sheets

FIG_3 PRIOR ART

FIG_4 PRIOR ART

FIG_5 PRIOR ART

FIG_6

FIG_7

FIG_8

FIG_9

FIG_10a

FIG_10b

FIG_10c

FIG_11

FIG_12

METHOD OF ACQUIRING AN IMAGE BY PUSH-BROOM SCANNING

FIELD OF THE INVENTION

The present invention relates to a method of acquiring a satellite observation image of the earth by "push-broom" scanning using a strip or a matrix of detectors of the charge coupled device (CCD) type moving relative to the observed zone.

BACKGROUND OF THE INVENTION

Figure 1:
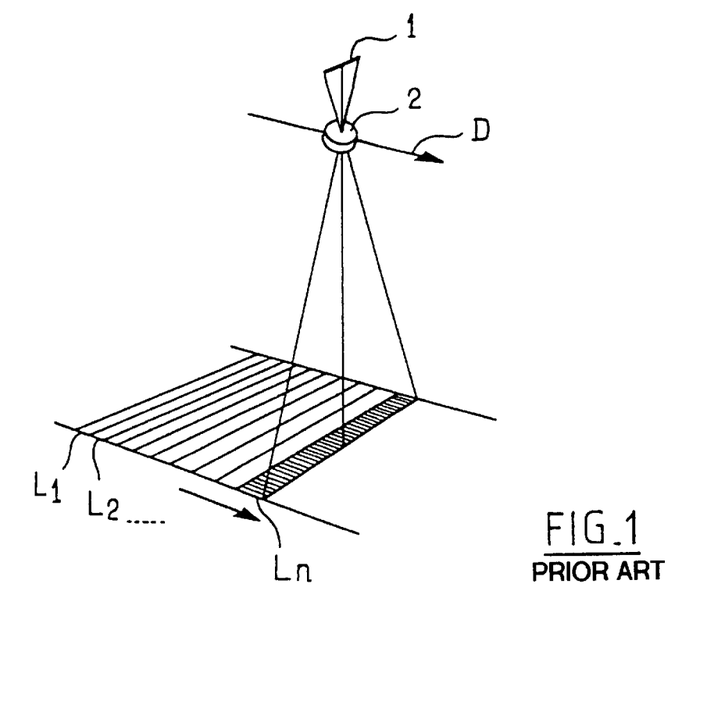
FIG. 1 shows the principle of acquisition by push-broom scanning.

The principle of "push-broom" type scanning is shown in FIG. 1 for the case of a detector strip 1.

As the satellite carrying the strip 1 moves, the strip observes successive lines L1, L2, . . . , Ln extending perpendicularly to its displacement direction (arrow D). At any instant, an instrumentation optical system 2 forms an image of a line of the scene on a line of detectors, the strip 1 being located in the focal plane of the optical system 2 extending perpendicularly to the velocity vector of the satellite. The scene passes in front of each detector which integrates the light flux during exposure time and transforms it into a proportional electrical charge.

Figure 2:
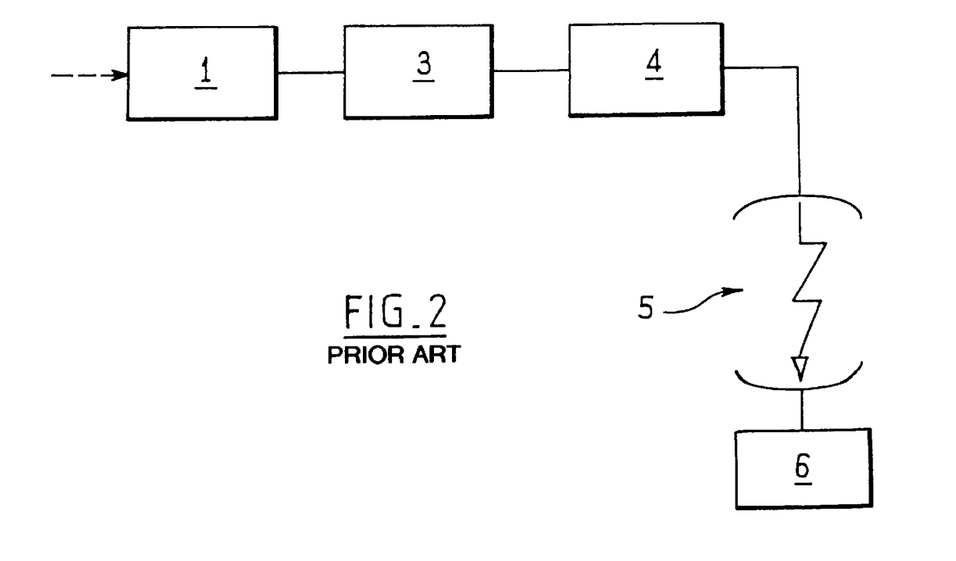
FIG. 2 shows a system for processing images taken by push-broom scanning.

FIG. 2 shows a conventional system for processing images taken in this way.

In outline, the processing system comprises a unit 3 for processing and amplifying the output from the detectors of the strip 1, an analog-to-digital encoder 4 receiving the output signal from the unit 3, means 5 for transmitting the digital images taken in this way from the satellite to the ground, and a unit 6 on the ground for reconstituting images.

The unit 3 comprises, in particular, a shift register into which the information integrated and stored in each detector of the strip 1 in the form of charge is transferred at the end of the exposure time. This register then transfers charge electronically, converting it into a succession of voltages proportional to points of light flux as received and integrated.

The unit 6 on the ground reconstitutes images in particular by implementing deconvolution processing to compensate for instrument defects, and also, where appropriate, interpolation processing for reconstituting certain pixels of the image.

Usually, the acquisition time between two successive lines, or "sampling time", is such that the point on the ground situated vertically below the satellite is displaced through a distance equal to the dimensions of an individual detector as projected onto the ground.

With reference to the focal plane of the instrument, this gives rise to line and column sampling frequencies that are the same and equal to the reciprocal of the size of an individual detector in the focal plane.

However, this approach does not take account of the instrument modulation transfer function (MTF).

It is recalled that the modulation transfer function of an optical system is a function in frequency space representing the suitability of the system for transmitting various frequencies. It is characteristic of the reproduction of contrast in the scene by the system.

For push-broom type acquisition, the modulation transfer function depends mainly on the optics of the system, on the smearing effect (reduction in contrast due to motion), and on the detectors.

Observation systems are characterized by the cutoff frequency fc above which the MTF is negligible. A cutoff frequency can be associated with each of the effects contributing to the overall modulation transfer function (optical system, smearing, and integration on the photosensitive zone), the overall cutoff frequency being the smallest of the three above values.

The modulation transfer function associated with integration in the photosensitive zone cancels at a frequency equal to the reciprocal of the size of an individual detector which constitutes a first approximation to the corresponding cutoff frequency.

It is the integration effect on the photosensitive zone which generally determines the overall cutoff frequency.

For conventional acquisition where the sampling frequency fe is equal to the cutoff frequency fc, the Shannon condition (fe$\geq$2.fc) is not satisfied and this gives rise to a high degree of spectrum aliasing which introduces artifacts and makes any attempt at deconvolution or at interpolation difficult.

SUMMARY OF THE INVENTION

An object of the invention is to propose a processing method which makes it possible:

to limit spectrum aliasing, in order to make satisfactory restoration and/or interpolation of the image on the ground possible; and to minimize redundancy in the information transmitted to the ground so as to make best use of the data transmission capacities of the instruments.

A processing method has already been proposed in patent application FR 2 678 460 enabling images to be recorded and retransmitted with line and column sampling pitches that are half the size of a conventional scanning instrument, but with identical telescope and individual detectors.

Figure 3:
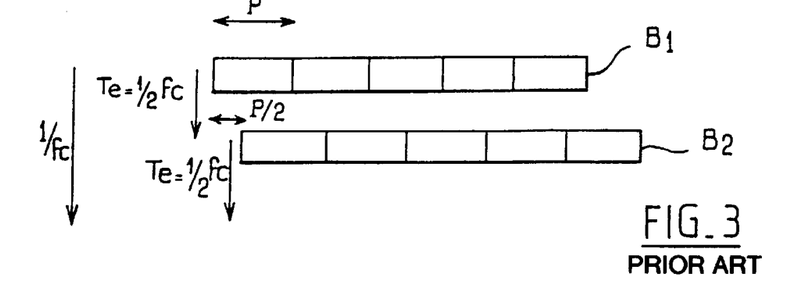
FIG. 3 shows acquisition using the method described in FR 2 678 460.

In that method, which is illustrated in FIG. 3, oversampling is performed by:

dividing the integration time and the sampling time by two, the column sampling frequency thus becoming equal to twice the cutoff frequency; and for lines, superposing measurements taken by two strips B1 and B2 that are offset relative to each other by a distance equal to half the size of an individual detector.

Two strips can be superposed by means of a line optical divider or by using the motion of the satellite by shifting in the field of the second strip by an integer number of sampling steps in the advance direction and by half a step in the lengthwise direction of the strip. The offset of the two sampling grids may be other than half a pixel, providing it is appropriately taken into account during processing, however, the optimal value of the offset is half the line and column size of an individual detector.

Figure 4:
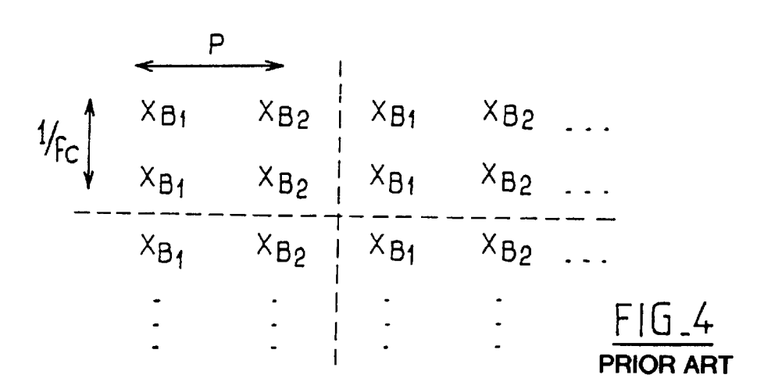
FIG. 4 shows a matrix of pixels obtained by implementing the acquisition of FIG. 3.

FIG. 4 shows a matrix of pixels obtained by such processing. Pixels $X_{B1}$ are those acquired with the strip B1, while pixels $X_{B2}$ are those acquired with the strip B2.

Each of the two strips B1 and B2 therefore generates a rectangular sampling grid having a pitch along the lines equal to the size of an individual detector and a pitch down the columns equal to half of said value, the two grids being offset by a distance equal to half an individual detector. As shown in FIG. 4, a square sampling grid is indeed reconstituted by interleaving, with the line pitch coinciding with the column pitch and being equal to half the size of an individual detector.

A method is thus made available that satisfies the Shannon sampling condition at the cost of quadrupling the information rate.

Figure 5:
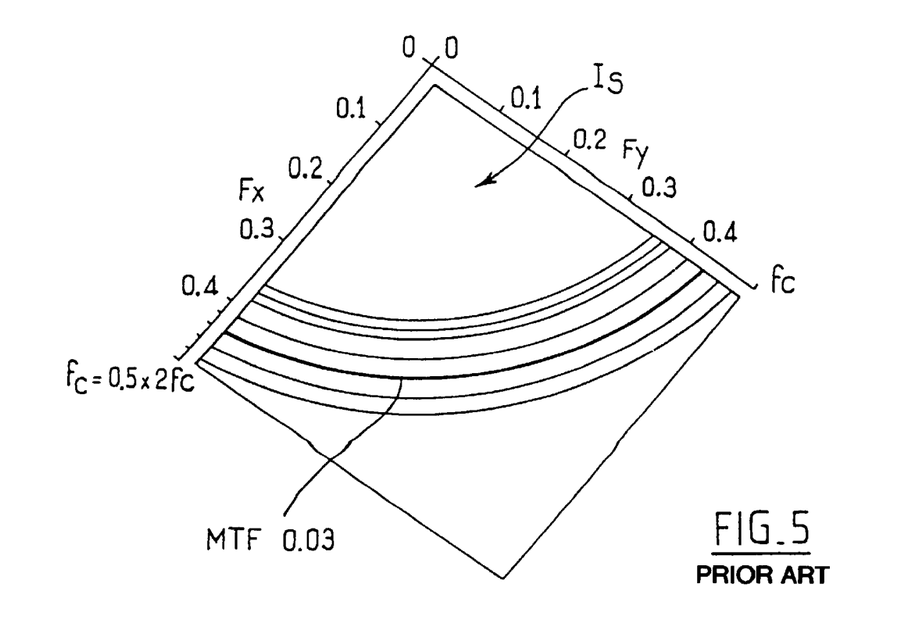
FIG. 5 is a representation in the Fourier plane of level curves of the modulation transfer function having rectangular symmetry.

FIG. 5 is a representation in the Fourier plane of a realistic modulation transfer function (MTF) for a push-broom type observation instrument, used in application of the acquisition method described in FR 2 678 460. This MTF is expressed as the product of a transfer function mtfl of normalized line frequencies fx and a transfer function mtfc of column frequencies fy, these two functions being given by the following equations for the SPOT 5 instrument:

$$mtfl = \frac{e^{(-3.431fx)}\sin(2\pi fx)}{2\pi fx}$$

$$mtfc = \frac{e^{(-3.03fy)}\sin(2\pi fy)\sin(\pi fy)}{2\pi^2 fy^2}$$

In this representation, the modulation transfer function is normalized to 1 at the origin and the frequencies fx and fy are normalized relative to twice the conventional sampling frequency, and the various curves represent level curves with a step size of 0.01 up to the value 0.1.

It can be seen in this representation that the modulation transfer functions are small over a large portion of the spectrum of frequency origin.

The functions mtfl and mtfc cancel for fx=fy=0.5, and the Shannon condition is therefore satisfied.

All of the significant information is essentially contained in the top triangle $I_s$, whose vertices correspond to the origin in the Fourier plane and to the points (0, 0.5) and (0.5, 0).

The MTF curve of level 0.03 is tangential to this zone, and below that level the signal is assumed to be buried in noise. Beyond the curve, i.e. outside the above-specified zone $I_s$, the signal is unusable.

Consequently, the sampling proposed in the technique described in application FR 2 678 460 is not optimal. It uselessly transmits a large portion of the frequency plane.

An object of the invention is thus to propose an acquisition method that mitigates the above drawback: it serves to retain negligible spectrum aliasing while optimizing acquisition data rate.

Throughout the present text, it is assumed that the modulation transfer function is of rectangular symmetry.

The invention proposes a method of acquiring and processing a satellite observation image of the earth by means of at least one strip or a matrix of detectors of the charge transfer type travelling over an observed zone, in which a plurality of pixels are acquired, which pixels are sampled in a staggered configuration, the method being characterized in that the line pitch and the column pitch of said staggered sampling are such that the image spectrum is situated mainly in a zone of the Fourier plane where the modulation transfer function is meaningful and where spectrum aliasing is limited.

Compared with the above-described method of FR 2 678 460, the telemetry rate corresponding to a given image zone on the ground is thus divided by two.

More particularly, in an advantageous implementation, the invention provides a method of acquiring and processing a satellite observation image of the earth by means of at least two strips or matrices of detectors at the same pitch, extending in juxtaposed manner perpendicularly to their displacement directions, by an integer plus a fraction of the individual pitch step size parallel to their displacement direction, said strips or matrices being offset relative to each other by a fraction of the pitch step size, perpendicularly to their displacement direction, the method being characterized in that the sampling times of said two strips are equal to the reciprocal of the cutoff frequency of the individual detectors.

In another advantageous implementation, the invention provides a method of acquiring and processing a satellite observation image of the earth by means of at least one strip or matrix of detectors, at a pitch p corresponding to the reciprocal of the cutoff frequency of said detectors, the method being characterized in that said strip is oriented in its displacement plane at an angle $\alpha=1/n$ relative to its displacement direction, n being an integer number, and in that the sampling time of the individual detectors corresponds to a displacement of $p/\sqrt{1+n^2}$. A square sampling grid is thus generated in the geometry defined by the speed of the subsatellite point and by its perpendicular, the sampling pitch in said two directions being equal to $p/\sqrt{1+n^2}$. The sampling is thus densified by a factor $\sqrt{1+n^2}$ at the cost of reducing the swath by the same factor.

In yet another advantageous implementation, the invention provides a method of acquiring and processing a satellite observation image of the earth by means of a single strip or matrix of detectors with a sampling time corresponding to the reciprocal of the cutoff frequency of said detectors, the method being characterized in that the pixels obtained in this way are lumped together in groups of at least four adjacent pixels so as to perform sampling in a staggered configuration, the pitch between two lines of sampling performed in this way corresponding to the pitch between two successive lines of the initial matrix of pixels.

The sampling thus obtained from these various different implementations is transmitted to the ground where staggered interpolation is performed on the ground on the received pixels. Because of said lumping together and the staggered undersampling, an image can be reconstituted on the ground without spectrum aliasing.

BRIEF DESCRIPTION OF THE DRAWINGS

Other characteristics and advantages of the invention appear further from the following description. The description is purely illustrative and non-limiting. It should be read with reference to the accompanying drawings, in which only one-fourth of the spectrum is shown, the remainder being deducible therefrom by considerations of symmetry.

DETAILED DESCRIPTION OF THE INVENTION

Figure 6:
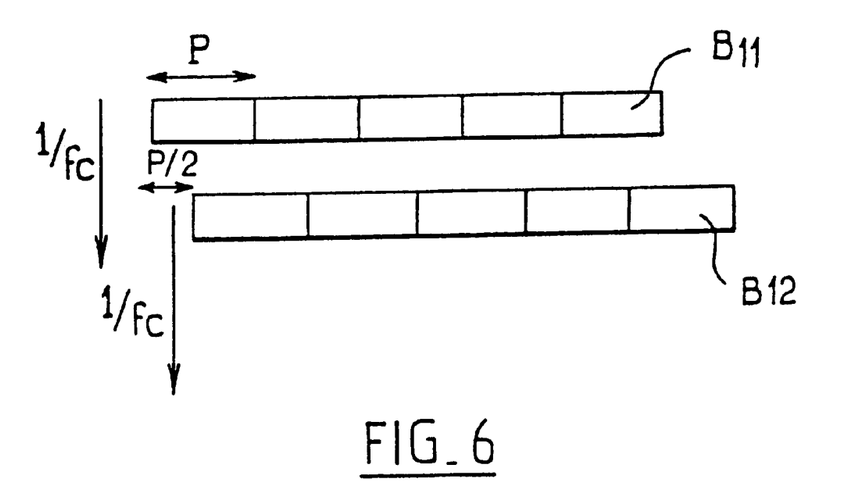
FIG. 6 shows one possible implementation of the invention.

FIG. 6 shows the acquisition processing performed by two linear strips $B_{11}$ and $B_{12}$ in one possible implementation of the invention.

The strips $B_{11}$ and $B_{12}$ are disposed in a manner similar to the strips B1 and B2: they are parallel and juxtaposed, and they are offset in their own length direction through a fraction of a pixel, e.g. half a pixel (i.e. p/2 where p is the pitch of individual detectors within a single strip).

The sampling time for each of the strips $B_{11}$ and $B_{12}$ is selected to be equal to 1/fc where fc is the cutoff frequency corresponding to the modulation transfer function of the equipment.

In practice, the sampling time 1/fc and the pitch p between detectors coincides.

Figure 7:
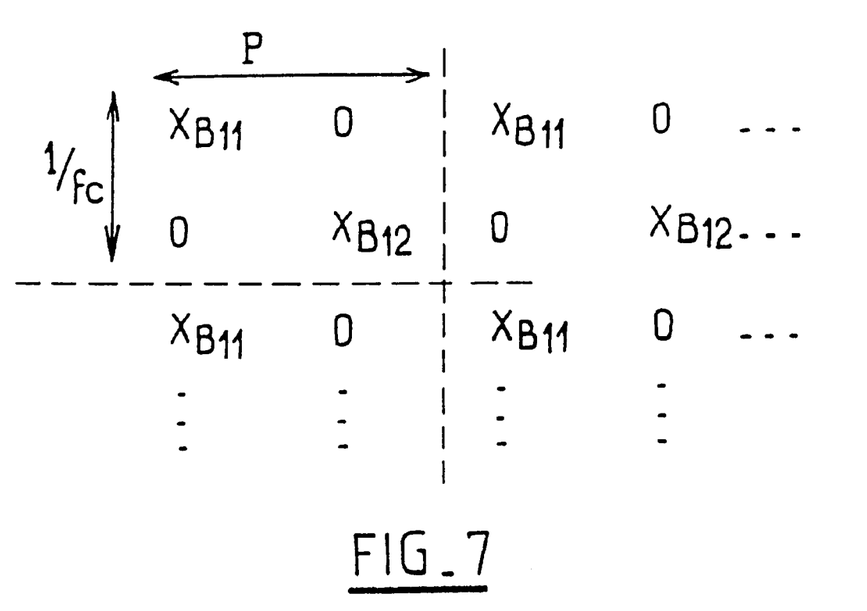
FIG. 7 shows a matrix of pixels acquired by implementing the method of FIG. 6.

The pixel matrix obtained in this way is shown in FIG. 7, where pixels acquired from the strip $B_{11}$ are referenced $X_{B11}$ and pixels acquired from the strip $B_{12}$ are referenced $X_{B12}$.

As can be seen in FIG. 7, this provides two images corresponding to the conventional acquisition pitches of 1/fc and p, but offset relative to each other by 1/2fc in the line direction and by p/2 in the column direction.

Consequently, compared with the acquisition described with reference to FIGS. 3 and 4, only one out of two pixels has been recorded in each line and in each column, in other words staggered sampling has been performed.

In the matrix of FIG. 7, the pixels of the FIG. 4 matrix that have not been acquired are replaced by 0s.

These 0 pixels are reproduced on the ground by interpolation from the pixels $X_{B11}$ and $X_{B12}$ adjacent thereto.

The interpolation processing enabling these missing pixels to be reconstituted is, for example, Fourier interpolation as is conventionally known to the person skilled in the art, and is not described in greater detail herein.

Naturally, other interpolation processing is possible. For example, it would also be possible to use interpolation processing of the type described in the publication:

"Analyse multirésolution pour les images avec un facteur de résolution √2" [Multi-resolution analysis for images with a √2 resolution factor] by J. C. FEAUVEAU, in the publication "Traitement du signal", Vol. 7, No. 2, 1990.

Since the pitch p generally corresponds to 1/fc, the acquisition performed is thus equivalent to staggered sampling, also called centered hexagonal sampling, of the same image rotated through 45° and at a pitch p.√2.

Figure 8:
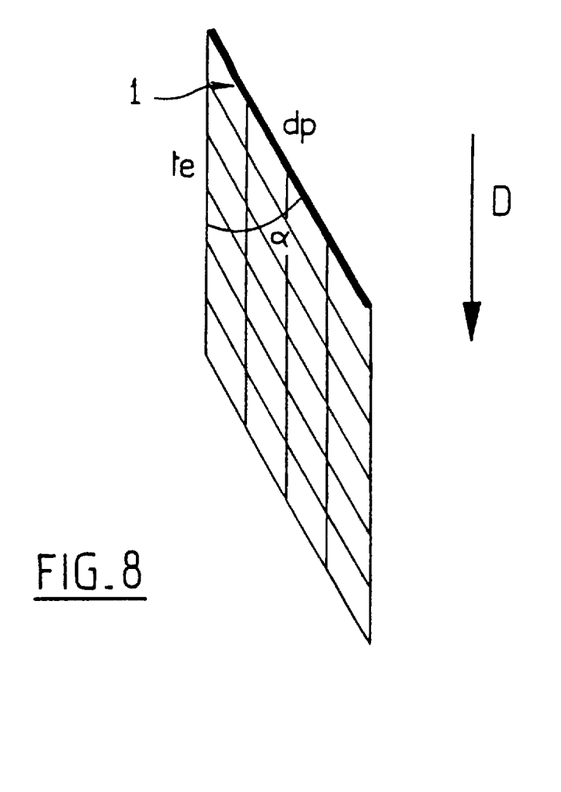
FIG. 8 shows another possible implementation of the invention.

Consequently, the sampling proposed by the invention can also be obtained, as shown in FIG. 8, by means of a single strip 11 parallel to the zone it is observing and extending in its displacement plane at an angle α of 45° relative to the displacement direction D.

The sampling time te in the displacement direction is then selected so as to correspond to p/√2, where p is the sampling pitch along the strip 1, with the sampling generated in this way corresponding to square sampling at a pitch p/√2.

Figure 9:
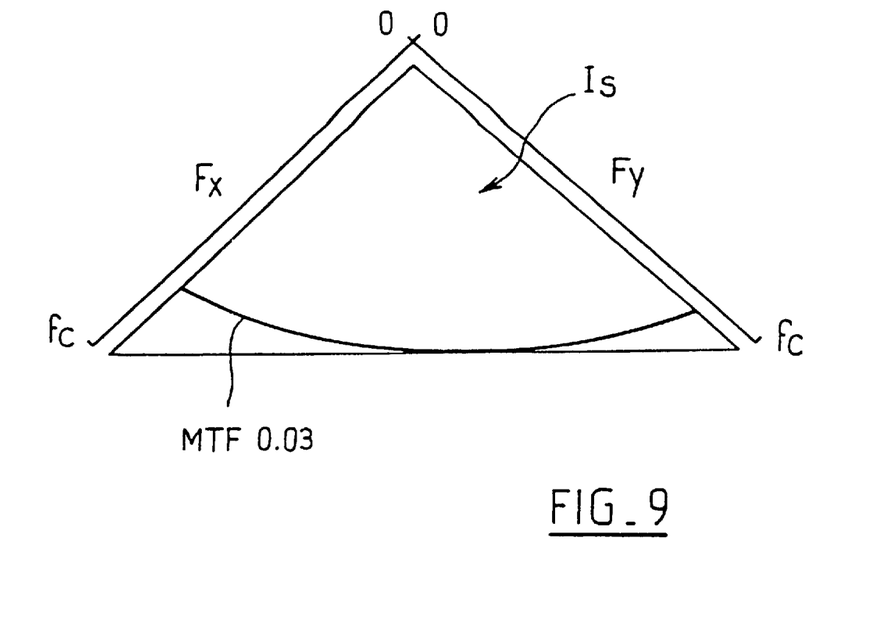
FIG. 9 is a representation in the Fourier plane of the spectrum of an image acquired by implementing the method of FIG. 6.

The spectrum of such sampling is shown in FIG. 9 and it corresponds to the sampling of FIG. 5 rotated through 45°.

It can be seen in this figure that the zone of the Fourier plane occupied by the image spectrum is the triangle tangential to the curve $MTF_{0.03}$.

Figure 10A:
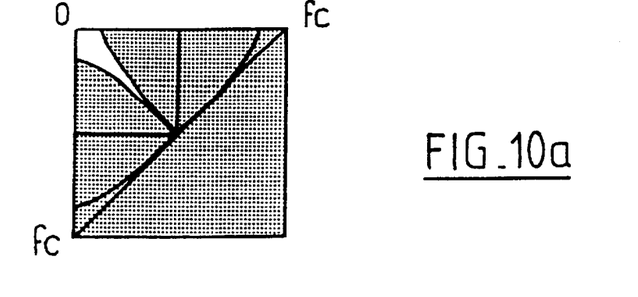
FIGS. 10a, 10b, and 10c show spectrum aliasing for each of these acquisitions.
Figure 10B:
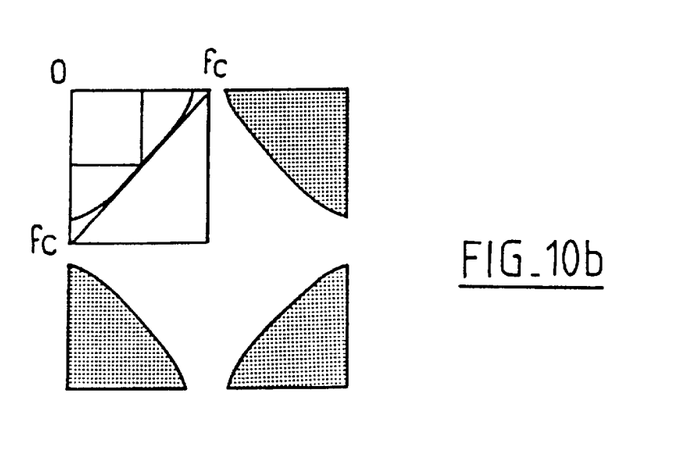
Figure 10C:
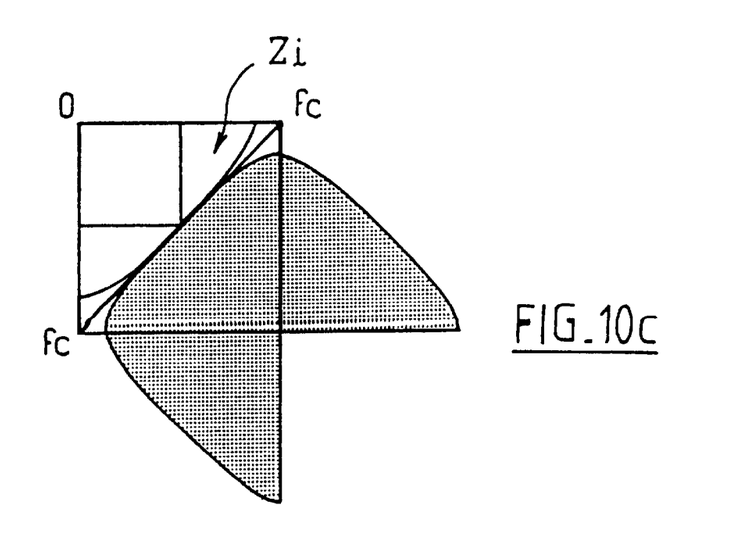

Reference is now made to FIGS. 10a to 10c.

The shaded zones in these figures are zones in the Fourier plane where spectrum aliasing is greater than 3% for each of the three acquisition modes.

It can be seen in FIG. 10a that with conventional acquisition, only a small portion of the information is relatively unpolluted (less than 15%).

When acquisition is performed using the processing described in FR 2 678 460, spectrum aliasing lies outside the zone occupied by the spectrum (FIG. 10b).

The same applies to the staggered processing proposed by the invention in which spectrum aliasing takes place outside the zone $Z_i$ (FIG. 10c).

These results are also given in Table I below, which shows:

the zone of the Fourier plane polluted by spectrum aliasing, expressed as a fraction of the area of the zone that is accessible a priori, given the sampling;

the zone of the Fourier plane in which the frequency content is not excessively attenuated by the transfer function, characterized by a modulation transfer function value greater than the 3% threshold; and the quantity of data produced to image the same zone, normalized by the "conventional" data rate.

TABLE I

|  | Conventional | FR 2 678 470 | Sampling of the invention |
|---|---|---|---|
| Zone affected by aliasing | 85% | 0% | 0% |
| Zone where MTF > 3% | 100% | 56% | 99% |
| Data rate | 1 | 4 | 2 |

It can be seen from this table that the processing described in FR 2 678 460 has no spectrum aliasing but it generates spectra that are largely empty.

Conversely, conventional processing uses a zone in the Fourier plane which is too small to contain all of the information transmitted by the instrumental modulation transfer function, and that leads to a high level of spectrum aliasing which prevents any deconvolution.

The sampling proposed by the invention serves to obtain a spectrum that occupies a zone in which the modulation transfer function is sufficient for the signal to be usable and in which spectrum aliasing is negligible. The data rate is half that of the sampling of FR 2 678 460.

The optimum nature of the sampling proposed comes from the collapse of the modulation transfer function (and thus of any information) taking place specifically on the diagonal in the direction where staggered sampling has its coarsest geometrical resolution. This makes it possible to perform deconvolution under good conditions.

Conversely, line resolution and column resolution are identical to those obtained with conventional sampling, i.e. taking all of the points which cancel at the Shannon frequency.

Figure 11:
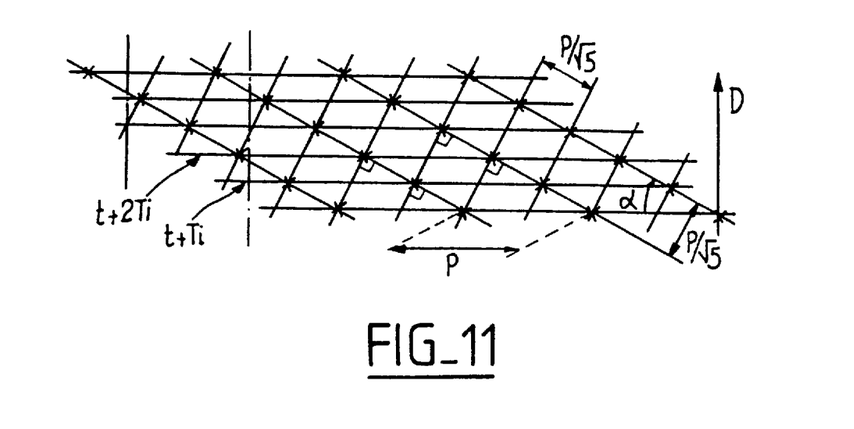
FIG. 11 shows another implementation of the invention similar to that of FIG. 8.

In general, and as shown in FIG. 11, a significant MTF and limited spectrum aliasing are advantageously obtained by means of a strip of detectors parallel to the zone that it observes and oriented in its displacement plane at an angle a relative to its displacement direction, such that:

Tan α=1/n, where n is an integer;

the sampling time corresponds to a displacement of $p/\sqrt{1+n^2}$.

The oversampling shown in FIG. 10 corresponds to the case where n=2.

The particular case where α=45° and the sampling time is equal to p/√2 corresponds to n=1.

Naturally, these various cases are based on the assumption that p corresponds to 1/fc.

Figure 12:
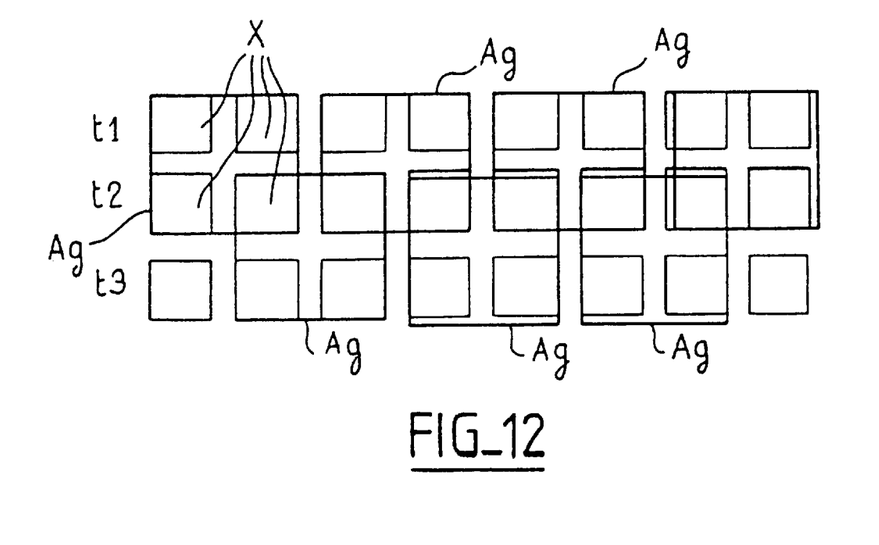
FIG. 12 shows another possible mode of processing for the invention.

FIG. 12 shows another possible mode of implementing the invention.

In this implementation, first sampling is performed conventionally by means of a single strip of detectors and with a sampling time corresponding to 1/fc.

In above-mentioned FIG. 12, fine lines represent pixels X of three lines $t_1$, $t_2$, $t_3$ taken with this sampling by means of a CCD detector strip.

In the processing corresponding to this implementation of the invention, the pixels X are lumped together in groups of at least four, while still retaining the same sampling frequency.

The pixels Ag obtained in this way are shown in heavy lines in FIG. 12, each pixel Ag being the sum of four adjacent pixels X distributed in a square.

The pixels Ag of a given lumped raster line are juxtaposed contiguously, with the pixels Ag of two successive lumped raster lines being offset by the width of half an Ag pixel, and overlapping by the height of one line of X pixels.

This provides staggered oversampling analogous to that of FIG. 7:

two successive lines are separated by 1/fc, i.e. twice 1/Fc where Fc corresponds to the cutoff frequency of the four lumped-together detectors in the strip used for the initial acquisition; and two pixels Ag on a given line are at a spacing which corresponds to the individual width of said pixels Ag.

On reception, staggered interpolation processing and deconvolution is performed on this oversampling.

With such processing, it is possible to restore almost completely the initial resolution of the image, even though the data rate is divided by two.

What is claimed is:

1. A method of acquiring and processing a satellite observation image of the earth by means of at least one strip or a matrix of detectors of the charge transfer type travelling over an observed zone, in which a plurality of pixels are acquired, which pixels are sampled in a staggered configuration, the method being characterized in that the line pitch and the column pitch of said staggered sampling are such that the image spectrum is situated mainly in a zone of the Fourier plane where the modulation transfer function is meaningful and where spectrum aliasing is limited.

2. A method according to claim 1 of acquiring and processing a satellite observation image of the earth by means of at least two strips or matrices of detectors at the same pitch, extending in juxtaposed manner perpendicularly to their displacement directions and offset by an integer plus a fraction of an individual pitch step size parallel to their displacement directions, said strips or matrices being offset relative to each other by a fraction of the pitch step size, perpendicularly to their displacement directions, the method being characterized in that the sampling times of said two strips are equal to the reciprocal of a cutoff frequency of the individual detectors.

3. A method according to claim 1 of acquiring and processing a satellite observation image of the earth by means of a single strip or matrix of detectors, at a pitch p corresponding to the reciprocal of a cutoff frequency of said detectors, the method being characterized in that said strip is oriented in its displacement plane at an angle $\alpha=1/n$ relative to its displacement direction, n being an integer number, and in that the sampling time of the individual detectors is $p/\sqrt{1+n^2}$.

4. A method according to claim 3, characterized in that the angle between the strip or matrix of detectors and the displacement direction is 45°, the sampling time of the individual detectors being $p/\sqrt{2}$.

5. A method according to claim 1 of acquiring and processing a satellite observation image of the earth by means of at least one strip or matrix of detectors with a sampling time corresponding to the reciprocal of a cutoff frequency of said detectors, the method being characterized in that the detectors obtained in this way are lumped together in groups of at least four adjacent detectors so as to perform sampling in said staggered configuration, the pitch between two lines of sampling performed in this way corresponding to the pitch between two successive lines of the initial matrix of detectors.

6. A method according to claim 1, characterized in that the sampling obtained in this way is transmitted to the ground, and in that the received detectors are subjected on the ground to staggered interpolation.

* * * * *